United States Patent
Husein et al.

(10) Patent No.: US 9,920,233 B2
(45) Date of Patent: Mar. 20, 2018

(54) DRILLING FLUIDS WITH NANO AND GRANULAR PARTICLES AND THEIR USE FOR WELLBORE STRENGTHENING

(71) Applicant: NFLUIDS INC., Calgary (CA)

(72) Inventors: Maen Moh'd Husein, Calgary (CA); Geir Hareland, Calgary (CA)

(73) Assignee: NFLUIDS INC., Calgary (CA)

( * ) Notice: Subject to any disclaimer, the term of this patent is extended or adjusted under 35 U.S.C. 154(b) by 86 days.

(21) Appl. No.: 14/400,938

(22) PCT Filed: Jul. 9, 2013

(86) PCT No.: PCT/CA2013/050532
§ 371 (c)(1),
(2) Date: Nov. 13, 2014

(87) PCT Pub. No.: WO2014/008598
PCT Pub. Date: Jan. 16, 2014

(65) Prior Publication Data
US 2015/0126415 A1    May 7, 2015

Related U.S. Application Data

(60) Provisional application No. 61/671,418, filed on Jul. 13, 2012.

(51) Int. Cl.
| | |
|---|---|
| C09K 8/36 | (2006.01) |
| C09K 8/516 | (2006.01) |
| E21B 33/138 | (2006.01) |
| C09K 8/502 | (2006.01) |
| E21B 21/00 | (2006.01) |

(52) U.S. Cl.
CPC ............... *C09K 8/36* (2013.01); *C09K 8/502* (2013.01); *C09K 8/516* (2013.01); *E21B 21/003* (2013.01); *E21B 33/138* (2013.01); *C09K 2208/10* (2013.01)

(58) Field of Classification Search
CPC ............ C09K 8/516; C09K 2208/10; C09K 2208/28; C09K 2208/32; C09K 8/16; C09K 8/36; C09K 8/40; C09K 8/46; C09K 8/473; C09K 8/487; C09K 8/502; C09K 8/5045; C09K 8/524; C09K 8/528; C09K 2208/12; C09K 2208/20; C09K 2208/22; C09K 8/03; C09K 8/508; C09K 8/536; C09K 8/605; C09K 8/62; C09K 8/68; C09K 8/70; C09K 8/805; C09K 8/90; E21B 21/003; E21B 33/138; E21B 43/25
See application file for complete search history.

(56) References Cited

U.S. PATENT DOCUMENTS

| | | | |
|---|---|---|---|
| 3,622,513 A | 11/1971 | Miller | |
| 3,658,701 A | 4/1972 | McGlothlin et al. | |
| 6,579,832 B2 | 6/2003 | Jimenez et al. | |
| 6,710,020 B2 | 3/2004 | Tenne et al. | |
| 6,783,746 B1 | 8/2004 | Zhang et al. | |
| 6,830,695 B1 | 12/2004 | Brady et al. | |
| 7,559,369 B2 | 7/2009 | Roddy et al. | |
| 8,071,510 B2 | 12/2011 | Scoggins et al. | |
| 2002/0131923 A1 | 9/2002 | Acton et al. | |
| 2004/0000434 A1 | 1/2004 | Todd et al. | |
| 2005/0107265 A1 | 5/2005 | Sullivan et al. | |
| 2007/0161515 A1 | 7/2007 | Bicerano | |
| 2008/0234149 A1 | 9/2008 | Malshe et al. | |
| 2009/0029878 A1 | 1/2009 | Bicerano | |
| 2009/0082230 A1 | 3/2009 | Javora et al. | |
| 2009/0314549 A1 | 12/2009 | Chenevert et al. | |
| 2010/0204067 A1 | 8/2010 | Hoskins | |
| 2011/0000672 A1 | 1/2011 | Huang | |
| 2011/0059871 A1 | 3/2011 | Tour et al. | |
| 2011/0162845 A1 | 7/2011 | Ravi et al. | |
| 2011/0312857 A1 | 12/2011 | Amanullah et al. | |
| 2012/0015852 A1* | 1/2012 | Quintero ............... | C09K 8/032 507/112 |
| 2012/0165231 A1 | 6/2012 | Miller et al. | |

FOREIGN PATENT DOCUMENTS

| | | |
|---|---|---|
| CA | 2485777 | 5/2005 |
| CA | 2586832 | 11/2007 |
| CA | 2663192 | 3/2008 |
| CA | 2745188 | 6/2010 |
| CA | 2755727 | 9/2010 |
| CN | 101559985 A | 10/2009 |

(Continued)

OTHER PUBLICATIONS

Sushant Agarwal et al: "Flow Behavior of Nanoparticle Stabilized Drilling Fluids and Effect of High Temperature Aging", AADE-11-NTCE-3, Apr. 2011.*
M. F. Zakaria et. al. Novel nanoparticle-based drilling fluid with improved characteristics, SPE International Oilfield Conference #SPE156992, Jun. 12-14, 2012.*
Australian Application No. 2013289816, Examination Report dated Jan. 19, 2016.
Cloisite 30B Product Specification—Neutrino [retrieved from the internet Jan. 14, 2016], URL: http://www.neunano.com/index.php?option=com_content&view=article&id=72Itemid=83>, 2 pages.

(Continued)

*Primary Examiner* — Kumar R Bhushan
(74) *Attorney, Agent, or Firm* — Fennemore Craig, P.C.

(57) ABSTRACT

There is described a drilling fluid for wellbore strengthening having nanoparticles and granular particles. In one aspect described herein, the drilling fluid is an invert emulsion based fluid. In a further aspect, the nanoparticles are iron hydroxide or calcium carbonate, and in a further aspect from about 1 to 30 nm in size. In one aspect described herein, the granular particles are graphite or calcium carbonate and in a further aspect, up to 250 μm in size. The nanoparticles and granular particles plug fractures in the wellbore to strengthen the wellbore.

24 Claims, 9 Drawing Sheets

(56) References Cited

FOREIGN PATENT DOCUMENTS

| | | |
|---|---|---|
| EP | 1944348 | 7/2008 |
| WO | 2007010212 | 1/2007 |
| WO | 2011054111 | 5/2011 |
| WO | 2012009128 | 1/2012 |
| WO | 2012129302 | 9/2012 |
| WO | 2013116920 | 8/2013 |

OTHER PUBLICATIONS

Bitumexport: Additives and materials for asphalt and water proofing [retrieved from the internet Jan. 14, 2016], URL: http://bitumexport.weebly.com/drilling-gilsonite.html>, 2 pages.

U.S. Appl. No. 14/377,441, Office Action dated Mar. 10, 2016.

Nassar et al., "Ultradispersed particles in heavy oil: Part I, preparation and stabilization of iron oxide/hydroxide", Fuel Processing Technology, Feb. 2010, vol. 91, pp. 164-168.

Australian Patent Application No. 2012369546, Examination Report dated Apr. 14, 2016.

Mohapatra, M., et al. "Synthesis and applications of nano-structured iron oxides/hydroxides—a review", International Journal of Engineering, Science and Technology, vol. 2, No. 8, Accepted for Publication Nov. 2010, pp. 127-146.

Chang et al., "Enhancement effect of nanoparticles on the sliding wear of short fiber-reinforced polymer composites: A critical discussion of wear mechanisms", Tribology International, Dec. 2010, vol. 43, pp. 2355-2364.

Zakaria et al., "Novel Nanoparticle-Based Drilling Fluid with Improved Characteristics", SPE 156992, SPE International Oilfield Nanotechnology Conference, Noordwijk, The Netherlands, Jun. 12-14, 2012, pp. 1-6.

Zhang et al., "Performance and anti-wear mechanism of CaCO3 nanoparticles as a green additive on poly-aplha-olefin", Tribology International, Feb. 2009, vol. 42, pp. 1029-1039.

Aston et al., "Drilling Fluids for Wellbore Strengthening", IADS/SPE 87130, IADC/SPE Drilling Conference, Dallas, Texas, Mar. 2-4, 2004, pp. 1-8.

Abdullah et al., "Tribological Behaviour of OA-Capped WO3 Nanoparticles as an Additive to Base Oils", Sains Malaysiana, Sep. 2008, vol. 37, No. 3, pp. 227-232.

Verma et al., "Tribological Behavior of Deagglomerated Active Inorganic Nanoparticles for Advanced Lubrication", Tribology Transactions, Oct. 2008, vol. 51, pp. 673-678.

Alberty et al., "A Physical Model for Stress Cages", SPE Annual Technical Conference and Exhibition, Houston, Texas, Sep. 26-29, 2004, pp. 1-8.

Amanullah et al., "Nano-Technology—Its Significance in Smart Fluid Development for Oil and Gas Field Application", SPE 126102, SPE Saudi Arabia Section Technical Symposium and Exhibition, Alkhobar, Saudi Arabia, May 9-11, 2009, 12 pages.

Amanullah et al., "Preliminary Test Results of Nano-Based Drilling Fluids for Oil and Gas Field Application", SPE/IADC 139534, SPE/IADC Drilling Conference and Exhibition, Amsterdam, Netherlands, Mar. 1-3, 2011, pp. 1-9.

Aston et al., "Towards Zero Fluid Loss Oil Based Muds", SPE 77446, SPE Annual Technical Conference and Exhibition, San Antonio, Texas, Sep. 29-Oct. 2, 2002, pp. 1-9.

Bumajdad et al., "Characterization of iron hydroxide/oxide nanoparticles prepared in microemulsions stabilized with cationic/non-ionic surfactant mixtures", Journal of Colloid and Interface Science, Mar. 2011, vol. 355, pp. 282-292.

Cai et al., "Synthesis and Anion Exchange of Tunnel Structure Akaganeite", Chem. Mater, Nov. 1, 2001, vol. 13, pp. 4595-4602.

Canter, "Boron Nanotechnology-Based Lubricant Additive", Tribology & Lubrication Technology, Aug. 2009, pp. 6-7.

Dupriest, "Fracture Closure Stress (FCS) and Lost Returns Practices", SPE/IADC, SPE/IADC 92192 Drilling Conference, Amsterdam, The Netherlands, Feb. 23-25, 2005, pp. 1-11.

Fjelde, "Formation Damages Causes by Emulsions During Drilling With Emulsified Drilling Fluids", SPE 105858, SPE International Symposium on Oilfield Chemistry, Houston, Texas, Feb. 28-Mar. 2, 2007, p. 1-8.

Guthrie et al., "Novel Fluids for Deep Oil and Gas Drilling", The Energy Lab, Project Summary, Complementary Research Program under Subtitle J, Section 999 of the Energy Policy Act of 2005, 2 pages.

Husein et al., "Nanoparticle Preparation Using the Single Microemulsions Scheme", Current Nanoscience, Nov. 2008, vol. 4, pp. 370-380.

International Patent Application No. PCT/CA2012/050075, International Preliminary Report on Patentability dated Aug. 12, 2014.

International Patent Application No. PCT/CA2012/050075, International Search Report and Written Opinion dated Jul. 16, 2012.

International Patent Application No. PCT/CA2012/050688, International Preliminary Report on Patentability, dated Aug. 12, 2014.

International Patent Application No. PCT/CA2012/050688, International Search Report and Written Opinion dated Dec. 21, 2012.

International Patent Application No. PCT/CA2013/050532, International Preliminary Report on Patentability dated Jan. 13, 2015.

International Patent Application No. PCT/CA2012/050688, International Search Report and Written Opinion dated Oct. 2, 2013.

Ke et al., "Lubricity of Brine Completion and Workover Fluids", SPE 130679, SPE/ICoTA Coiled Tubing and Well Intervention Conference and Exhibition, The Woodlands, Texas, Mar. 23-24, 2010, pp. 1-7.

Kercheville et al., "Comparison of Environmentally Acceptable Materials With Diesel Oil for Drilling Mud Lubricity and Spotting Fluid Formulations", IADC/SPE 14797, IADC/SPE Drilling Conference, Dallas, Texas, Feb. 10-12, 1986, pp. 1-5.

Kokal, "Crude-Oil Emulsions: A State-of-the-Art Review", SPE Productions & Facilities, Society of Petroleum Engineers, Feb. 2005, pp. 5-13.

Kostic, "Development of Hybrid, Tribological Nanofluids with Enhanced Lubrication and Surface-Wear Properties", Department of Mechanical Engineering, Northern Illinois University, Mar. 27, 2015, pp. 1-3.

Kumar et al., "Wellbore Strenghtening: The Less-Studied Properties of Lost-Circulation Materials", SPE 133484, SPE Annual Technical Conference and Exhibition, Florence, Italy, Sep. 19-22, 2010, pp. 1-13.

Lai et al., "Adsorption/desorption properties of copper ions on the surface of iron-coated sand using BET and EDAX analyses", Chemosphere, Oct. 2000, vol. 41, pp. 1249-1255.

Lammons, "Field use documents glass-bead performance", Technology, Oil & Gas Journal, Nov. 26, 1984, pp. 109-111.

Lee al., "AADE 2009NTCE-18-04: Use of magnetic nanoparticles for smart drilling fluids", 2009 National Technical Conference & Exhibition, New Orleans, Louisiana, pp. 1-5.

Morita et al., "Theory of Lost Circulation Pressure", SPE 20409, 65th Annual Technical Conference and Exhibition of the Society of Petroleum Engineers, New Orleans, Louisiana, Sep. 23-26, 1990, pp. 43-58.

Moshkovith et al., "Sedimentation of IF-WS2 aggregates and a reproducibility of the tribological data", Science Direct, Tribology International, Jan. 2007, vol. 40, pp. 117-124.

Mosleh et al., "Modification of sheet metal forming fluids with dispersed nanoparticles for improved lubrication", Wear, Jun. 15, 2009, vol. 267, pp. 1220-1225.

Nassar et al., "Study and Modeling of Iron Hydroxide Nanoparticle Uptake by AOT (w/o) Microemulsions", Langmuir, Dec. 2007, vol. 23, pp. 13093-13103.

Nassar et al., "Preparation of iron oxide nanoparticles from FeCl3 solid powder using microemulsions", phys. stat. sol. (a), Apr. 2006, vol. 203, No. 6, pp. 1324-1328.

Newman et al., "AADE 2009-NTCE-08-02: Advances in Mixing Technology Improve Drilling Fluid Preparation and Properties", 2009 National Technical Conference & Exhibition, New Orleans, Louisiana, pp. 1-5.

Salehi et al., "Evaluation of New Drilling Approach for Widening Operational Window: Implications for Wellbore Strengthening",

(56) References Cited

OTHER PUBLICATIONS

SPE 140753, SPE Production and Operations Symposium, Oklahoma City, Oklahoma, Mar. 27-29, 2011, pp. 1-16.
Sensoy et al., "Minimizing Water Invasion in Shale Using Nanoparticles", SPE 124429, SPE Annual Technical Conference and Exhibition, New Orleans, Louisiana, Oct. 4-7, 2009, pp. 1-16.
Sensoy, "Use of Nanoparticles for Maintaining Shale Stability", Thesis Presented to the Faculty of the Graduate School of the University of Texas at Austin, May 2009, 93 pages.
Skalle et al., "Microbeads as Lubricant in Drilling Muds Using a Modified Lubricity Tester", SPE 56562, 1999 SPE Annual Technical Conference and Exhibition, Houston, Texas, Oct. 3-6, 1999, pp. 1-7.
Song et al., "Preventing Mud Losses by Wellbore Strengthening", SPE 101593, 2006 SPE Russian Oil and Gas Technical Conference and Exhibition, Moscow, Russia, Oct. 3-6, 2006, pp. 1-3.
Srivatsa et al., "An Experimental Investigation on use of Nanoparticles as Fluid Loss Additives in a Surfactant-Polymer Based Drilling Fluid", IPTC 14952, International Petroleum Technology Conference, Bangkok, Thailand, Feb. 7-9, 2012, pp. 1-19.
Riley et al., "Wellbore Stability in Unconventional Shale—The Design of a Nano-particle Fluid", SPE 153729, SPE Oil and Gas India Conference and Exhibition, Mumbai, India, Mar. 28-30, 2012, pp. 1-8.
Streat et al., "Hydrous ferric oxide as an adsorbent in water treatment Part 1. Preparation and physical characterization", Science Direct, Process Safety and Environmental Protection, Jan. 2008, vol. 86, pp. 1-9.
Vahidreza et al., "Experimental Analysis and Mechanistic Modeling of Wellbore Strengtening", University of Calgary. A Thesis, Department of Chemical and Petroleum Engineering, Calgary, Alberta, Dec. 2011, 182 pages (4 Parts).
Wang et al., "Strengthening a Wellbore with Multiple Fractures: Further Investigation of Factors for Strengthening a Wellbore", ARMA 09-67, the 43rd US Rock Mechanisms Symposium and 4th U.S.-Canada Rock Mechanics Symposium, Asheville, North Carolina, Jun. 28-Jul. 1, 2009, 9 pages.
Wu et al., "Experimental analysis of tribological properties of lubricating oils with nanoparticle additives", Science Direct, Wear, Mar. 2007, vol. 262, pp. 819-825.
Yang et al., "Research and Application of Nanoscale Emulsion Lubricating Material for Drilling Fluid in Daqing Oil Field", IADC/SPE 161899, Asia Pacific Drilling Technology Conference and Exhibition, Tianjin, China, Jul. 9-11, 2012, pp. 1-7.
Zakaria et al., "Examining How Selecting the Right Drilling Fluids/Muds Can Extend the Reach of Horizontal Wells, Decrease Fluid Losses and Increase Wellbore Strength: The Application of Nanoparticles", Horizontal Drilling, Tight Oil Plays Conference, Jun. 2012, University of Calgary, 37 pages.
European Patent Application No. 12867972.7, Search Report dated Sep. 10, 2015.
U.S. Appl. No. 14/377,441, Office Action dated Sep. 25, 2015.
Australian Patent Application No. 2012369545, Examination Report dated Sep. 15, 2015.
European Patent Application No. 13813096.5, Search Report dated Nov. 5, 2015.
Australian Patent Application No. 2012369546, Examination Report dated Oct. 22, 2015.
U.S. Appl. No. 14/377,438, Restriction Requirement dated Nov. 13, 2015.
Agarwal et al., "Flow Behavior of Nanoparticle Stabilized Drilling Fluids and Effect of High Temperature Aging", AADE-11-NTCE-3, 2011 AADE National Technical Conference and Exhibition, Houston, Texas, Apr. 12-14, 2011, pp. 1-6.
Colombian Application No. 14-286185, Office Action dated Dec. 22, 2016, including English Summary.
Colombian Application No. 14-197884, Office Action dated Dec. 16, 2016, including English Summary.
Guo et al., Derwent 2009-Q64632, English Abstract, Jun. 2011.
U.S. Appl. No. 14/377,441, Final Office Action dated Dec. 19, 2016.
U.S. Appl. No. 14/377,438, Final Office Action dated Dec. 16, 2016.
Australian Patent Application No. 2013289816, Examination Report dated Jul. 15, 2016.
Columbian Application No. 14-197884, Office Action dated Jun. 13, 2016 w/English Translation.
Columbian Application No. 14-286185, Office Action dated Jun. 27, 2016 w/English Translation.
European Application No. EP13816096, Supplementary Search Report dated Nov. 5, 2015.
International Application No. PCT/CA2013/050532, Search Report and Written Opinion dated Oct. 2, 2013.
U.S. Appl. No. 14/377,441, Office Action dated Jun. 20, 2016.
U.S. Appl. No. 14/377,438, Office Action dated Aug. 22, 2016.
Australian Patent Application No. 2012369546, Notice of Acceptance dated Aug. 9, 2016.
Australian Patent Application No. 2012369545, Notice of Acceptance dated Jul. 22, 2016.
Australian Application No. 2013289816, Notice of Acceptance dated Nov. 4, 2016.
Nassar, "Preparation of Iron Oxide Nanoparticles from FeCl3 Solid Powder Using Microemulsions", Physica Status Solidi A, Published online Apr. 20, 2006, vol. 203, No. 6, pp. 1324-1328.

\* cited by examiner

DRILLING FLUIDS WITH NANO AND GRANULAR PARTICLES AND THEIR USE FOR WELLBORE STRENGTHENING

FIELD

Described herein are drilling fluids with a blend of nano and granular particles for strengthening of the wellbore in an underground formation, and in particular invert emulsion-based drilling fluids containing such particles.

BACKGROUND

Hydrocarbons, such as oil and gas, are recovered from underground formations through drilled wells. The success of any well drilling operation depends on many factors and one of the most important is the drilling fluid. Drilling fluids, also called drilling muds, are circulated from the surface through the drill string and introduced to the bottom of the borehole as fluid spray out of drill bit nozzles and subsequently circulated back to the surface via the annulus between the drill string and the well hole. Drilling fluids are formulated to cool down and lubricate the drill bit, remove cuttings from the hole, prevent formation damage, suspend cuttings and weighting materials when circulation is stopped, and cake off the permeable formation by retarding the passage of fluid into the formation.

Drilling operations face great technical challenges with drilling fluid loss being the most notable. Fluid loss is also an issue for other well fluids such as kill fluids, completion fluids and stimulation fluids. Drilling fluid loss is the partial or complete loss of fluid to the formation during drilling. Loss of fluid causes several severe consequences to the drilling operations. Loss of fluid, in turn, impacts the cost of drilling. Therefore, drilling and other well fluids are typically formulated with loss circulation materials or additives (LCM). The primary function of LCM is to plug the zone of loss in the formation, away from the borehole face so that subsequent operation will not suffer additional fluid losses. LCM forms a barrier which limits the amount of drilling fluid penetrating the formation and prevents loss.

Lost circulation is the leading cause of non-productive time on an oil rig[1] or drilling site. This is a particular problem while drilling with a narrow mud weight window, for example in depleted reservoirs. Mud weight required for well control and to maintain a stable wellbore generally exceeds the fracture resistance of a formation. Casing strings are designed at different stages of the well so that the well can be drilled where the mud weight window is balanced between the pore and fracture pressure with depth. This boundary value also typically includes a safety of trip tolerance added to the pore pressure and subtracted from the fracture pressure.

A drilling fluid that effectively increases the fracture pressure tolerance gradient strengthens the wellbore and increases the fracture gradient. The result of this effect is that the drilling design of a well might require one or more less drill string casings/hole sizes which highly affects the drilling and completion economics of a well. As an example, a three different hole size casing program with surface, intermediate and main hole casing can, with these new fluids, be designed with only one surface and one main borehole casing which could then have a larger hole size in the production zone and produce at higher rates as well. This is also called a mono-bore oil and gas wellbore. The more casing sizes run on a well, the higher the potential is to reduce the number of strings and save money.

In a depleted reservoir, there is a drop in pore pressure as the reserves decline which weakens the hydrocarbon-bearing rocks but neighboring low permeability rocks such as shale may maintain their pore pressure. The result is that the mud weight required to support the shale exceeds the fracture resistance of the sands and silts. This leads to severe mud losses that prevent drilling ahead and creates the possibility of sticking the bottom hole assembly, drill pipe or liner/casing.

There are different technologies for dealing with this problem but preventive wellbore strengthening technologies are preferred. Wellbore strengthening increases the resistance of formations to circulation loss during drilling operations. By strengthening the wellbore, the width of the operating mud window is increased or the gap between the pore pressure and fracture gradient in the formation is widened. Wellbore strengthening may also prevent loss circulation, wellbore instability, stuck pipe, differential sticking, kick and blow out, excessive number of casings run and cutting removal issues.

One focus for strengthening wellbores is the properties of the solid contents of the drilling fluids since they play a key role in the process. LCM has been added to drilling fluids to successfully strengthen wellbores. This was achieved by widening fractures and effectively plugging them with the right sized particle LCM. This isolates the fracture tip from the fluid pressure which then controls the fracture propagation and ultimately increases the hoop stress around the wellbore.[2-8] The result is that the fracture pressure is increased. This allows an operator to use a drilling mud with a higher mud weight through the strengthened wellbore to access other sections of the formation.

It was previously thought that LCM's would only plug fractures and strengthen wellbores in permeable formations. LCM's were not effective in impermeable formations. Also small particles that only plugged the pore throat would not effectively plug a fracture and seal the formation. Leak off of the base fluid was required.[6] Nanoparticles were very effective at plugging pore throats but were not thought to be effective in strengthening wellbores. Nanoparticles have very different properties as compared to its parent material.[10]

Nanoparticles have been used in well fluids for a number of purposes.

U.S. Pat. No. 3,622,513 (1971) is directed to oil-based drilling fluids with improved plastering properties and reduced fluid loss properties at extreme conditions of borehole temperature and pressure. The drilling fluids contain asphaltous material and a weighting agent, usually barium sulfate having a particle size of 100 to 200 µm, which primarily result in the formation of the filter cake to prevent fluid loss to the formation. The drilling fluids also contain a small amount of a secondary weighting material inert to the fluid and having a particle size of less than 3 µm. The fluids showed some reduction in fluid loss. However, the compositions required extra additives, such as the asphalt material, which bind to the nanoparticles and acted as a filler or plaster between the particles at high temperature to reduce the fluid loss. The fluid may also contain other lost circulation additives.

U.S. Pat. No. 6,579,832 (2003) is directed to a method of rapidly adjusting the fluid density of drilling fluids using superparamagnetic nanoparticles. The particles were effective to change the density state of the fluid required to control subsurface pressures, and to preserve and protect the drilled hole until a casing is run and cemented. The nanoparticles were sized between 0.5 and 200 nm and formed into clusters having an average size of between 0.1 and 500 µm. The clusters were formed by incorporating the nanoparticles into a matrix of glass or ceramic. Group VIII metals Cd, Au and their alloys were found to provide an excellent result in adjusting fluid density in a reversible manner. 90% of the supermagnetic nanoparticles from the treated drilling fluid from the downhole location were recovered by a magnetic field at the surface resulting in the adjustment of drilling fluid density within a short period of time and circulation of the magnetic nanoparticles to the surface level for reuse in the drilling fluid.

U.S. Patent Application 2009/314549 (2009) considered compounds for reducing the permeability of shale formations using specific nanoparticles in the drilling fluids. By identifying the pore throat radii of shale samples, fine particles were selected that would fit into the pore throats during the drilling process and create a non-permeable shale surface. The drilling mud was a water-based mud with nanoparticles having a size range of 1-500 nm selected from silica, iron, aluminum, titanium or other metal oxides and hydroxides and also composed of a surface active agent. The aqueous well-drilling fluid contained between about 5 to 50 weight percent, based on the weight of the aqueous phase and resulted in a reduction in permeability of the shale, which resulted in drastic reduction of absorbed water and potential for collapse. The minimum concentration required to reduce the fluid penetration was 10 wt % nanoparticles and in some cases, required high concentrations of nanoparticles of 41 wt %.

Aqueous-based drilling fluids generally require a higher concentration of nanoparticles than other types of drilling fluids. They also require additional additives such as surfactants to stabilize the nanoparticles in the fluid system whereas other based fluids, such as invert emulsion drilling fluids, do not need to include other additives to completely disperse the nanoparticles. Nanoparticles that have a hydroxyl group tend to agglomerate faster in aqueous based fluids. This agglomeration causes poor dispersions and the addition of surfactants reduces this problem. Poor dispersion in turn causes fluid loss even after the addition of the nanoparticles. As well, flocculated or poorly dispersed suspensions form more voluminous sediments. The resulting filter cake is not as dense and impenetrable as compared to that formed from a stable suspension. Therefore, the use of nanoparticles in aqueous based fluids teaches little about its use in non-aqueous-based fluids such as invert emulsions.

A related publication is "Use of Nanoparticles for Maintaining Shale Stability" Sensoy (2009). It also discloses the use of nanoparticles in an aqueous drilling fluid for nanopore throat reduction. It found that the 5 wt % of nanoparticles in the fluid was less effective and the minimum level of nanoparticles was at least 10 wt %. It also tested higher levels of 29 wt % and 41 wt %. The paper concludes that higher amounts of nanoparticles were preferable to achieve the nanopore throat reduction.

U.S. Patent Application 2011/59871 (2010) relates to a drilling fluid including graphene and chemically converted nanoplatelet graphenes with functional groups. The graphene comprised about 0.001% to about 10 vol % of the drilling fluid. The functionalized chemically-converted graphene sheets were about 1.8 to about 2.2 nm in thickness. Whatman 50 allowed some graphene oxide to pass through the filter. Nanoparticles pass through the filter paper along with the filtrate which may block the interporosity of rock and create formation damage. This may result in permeability impairment and thus lead to a reduction in oil and gas production.

U.S. Patent Application 2009/82230 (2009) relates to an aqueous-based well treatment fluid, including drilling fluids, containing a viscosifying additive. The additive has calcium carbonate nanoparticles with a median particle size of less than or equal to 1 µm. The amount of calcium carbonate nanoparticles used in the drilling fluid was approximately 20 wt %. The nanoparticles used in the well treatment fluid were capable of being suspended in the fluid without the aid of a polymeric viscosifying agent. The addition of the nanoparticles altered the viscosity of the fluid. Nanoparticles suspended in a well treatment fluid even at high temperature as 350° F. typically exhibit sag (inadequate suspension properties) particularly at high temperatures of around 350° F. The viscosity changes of a fluid upon addition of nanoparticles were well reported.

U.S. Patent 2011/162845 discloses a method of servicing a wellbore. It introduces a lost circulation composition into a lost circulation zone to reduce the loss of fluid into the formation. The lost circulation composition comprised Portland cement in an amount of about 10 wt % to about 20 wt % (of the lost circulation composition), nanoparticles and in particular nano-silica in an amount of about 0.5 wt % to about 4 wt % and having a particle size of about 1 to about 100 nm, amorphous silica in an amount of about 5 wt % to about 10 wt %, synthetic clay in an amount of about 0.5 wt % to about 2 wt %, sub-micron sized calcium carbonate in an amount of about 15 wt % to about 50 wt % and water in an amount of about 60 wt % to about 75 wt %. Loss circulation additives are formed with a mix of nanocomponents and cement to reduce the setting time for mud cake formation and development of gel strength. However, high amounts of the nanoparticles are required with the cement to develop the mud cake formation and gel strength.

By virtue of their very small sizes, nanoparticles (NPs) have the potential of acting as effective lubricant additives. Their size and shape enable them to enter contact zones between surfaces easily. Inorganic nanoparticles mostly do not display any affinity to oil and may not be affected by the mud type. In-situ and ex-situ techniques for forming a wide variety of well dispersed NPs in an invert emulsion as well as water-based drilling fluid have been detailed in the art (Husein et al., 2012). These methods rely heavily on high shearing, which produces finely dispersed water pools, in the case of invert emulsion drilling fluids, and the use of these water pools as nanoreactors to form NPs with sizes mainly below 100 nm. Once formed, these NPs display very high stability in the mother drilling fluid and interact very effectively with the rest of the drilling fluid (Husein et al., 2012). Previous experiments showed that these particles perfectly seal filter cakes by creating crack-free, very smooth surfaces (Husein et al., 2012). Therefore, these particles contribute to the formation of slippery layers between the borehole and the drill string leading to lower overall friction coefficient and, subsequently, increase the extended reach of horizontal drilling. Moreover, due to the small sizes of these particles, the wear and tear of down hole equipment and tools becomes negligible as less kinetic energy (nano sized particles achieve lower sedimentation speed compare to the large sized particles) and abrasive action is encountered. Overall, the application of nanoparticles in drilling fluid presents a good potential for reducing friction while drilling and, hence, improve the extended reach.

Other references, such as Amanullah et al. 2011, consider the use of small amounts of nanoparticles in water and indicate the potential for beneficial effects on differential sticking, torque reduction and reduction of drag problems in certain types of drilling. However, these references experiment with nanoparticles in water and require very active stabilizers to maintain the nanoparticle dispersions or look at the interaction of nanoparticles with other components that may be present in a well fluid. The references do not provide data directly relevant to results in industrial drilling fluids but merely indicate further areas for research.

There is therefore a need for an additive for drilling fluids to more effectively strengthen the wellbore during drilling. This is achieved by plugging fractures with nanoparticles and granular particles present in the fluid in low amounts.

SUMMARY

It is an object of the present disclosure to obviate or mitigate at least one disadvantage of the previously known fluids.

Generally, described herein is a drilling fluid with nanoparticles and granular particles that act in a manner similar to lost circulation material (LCM) to provide wellbore strengthening. The fluid utilizes the unique properties and qualities of nanoparticles with regards to its very high surface area to volume ratio in a blend comprising nano materials and granular materials, blended with different drilling mud types for use in induced lost circulation zones. The granular particles (GP) and nanoparticles (NP) are present in low amounts in the fluid.

In one aspect described herein, there is described a drilling fluid having nanoparticles (NP) and granular particles (GP) for strengthening of the wellbore. The nanoparticles and granular particles act as lost circulation materials (LCM), plugging fractures. This isolates the fracture tip from the fluid pressure which then controls the fracture propagation and ultimately increases the hoop stress around the wellbore. In one aspect, the drilling fluid is an invert emulsion-based drilling fluid. In a further aspect, the nanoparticles are hydroxide, oxide, sulphate, sulphide, and carbonate nanoparticles. The nanoparticles are present in the fluid in low amounts. In one aspect described herein, the granular particles are graphite or calcium carbonate also present in low amounts in the fluids. As a result, the nanoparticles and granular particles do not significantly alter the other characteristics of the fluid.

In a further aspect, there is described a drilling fluid for strengthening a wellbore, comprising a base fluid comprising an invert emulsion fluid; a nanoparticle, wherein the nanoparticle is present in an amount of less than 5 wt %; and a granular particle, wherein the granular particle is present in an amount of less than 10.0 wt %.

In a further aspect, the fluid is used for strengthening of the wellbore during and/or after drilling the wellbore in an underground formation.

In further aspect, there is described a method of making the drilling fluid wherein the nanoparticles are formed in situ in the fluid comprising the steps of providing aqueous-based precursor solutions for forming the nanoparticles, adding the precursor solutions to the drilling fluid and subjecting the fluid to mixing and shear to form the nanoparticles in the fluid, and either before or after forming the nanoparticles adding granular particles to the fluid and subjecting the fluid to mixing and shear, to form the drilling fluid for strengthening the wellbore.

In a further aspect, there is described a method of making the drilling fluid wherein the nanoparticles are formed in situ in the fluid comprising the steps of providing powder precursor salts for forming the nanoparticles, adding the precursor powders to the drilling fluid and subjecting the fluid to mixing and shear to form the nanoparticles in the fluid, and either before or after forming the nanoparticles adding granular particles to the fluid and subjecting the fluid to mixing and shear, to form the drilling fluid for strengthening of the wellbore.

In a further embodiment, there is described a method of making the drilling fluid wherein the nanoparticles are formed ex situ comprising the steps of providing aqueous-based precursor solutions for forming the nanoparticles, mixing the precursor solutions under high shear, and adding the mixed precursor solution to the fluid, and either before or after adding the nanoparticles adding granular particles to the fluid and subjecting the fluid to mixing to form the drilling fluid for strengthening the wellbore.

Other aspects and features will become apparent to those ordinarily skilled in the art upon review of the following description of specific embodiments of the fluid in conjunction with the accompanying figures.

BRIEF DESCRIPTION OF THE DRAWINGS

Embodiments will now be described, by way of example only, with reference to the attached Figures.

DETAILED DESCRIPTION

Figure 1:
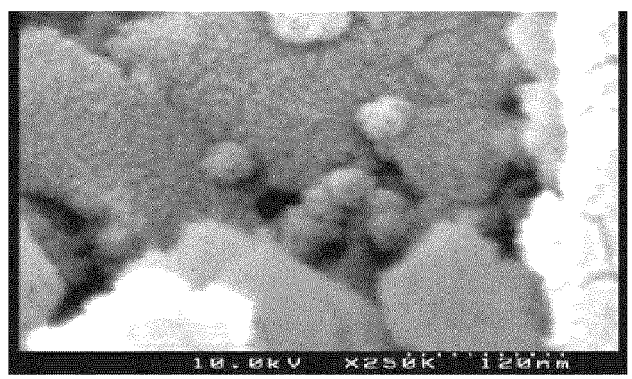
FIG. 1 shows aggregate of nano particles plugging a pore throat.[11]
Figure 2:
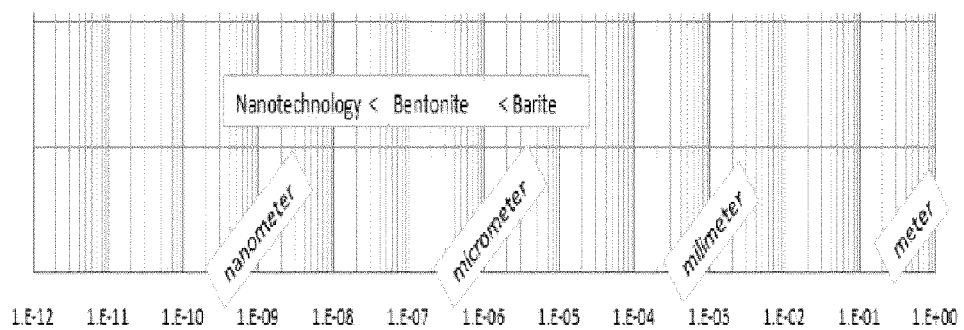
FIG. 2 shows a particle size scale.[11]
Figure 3:
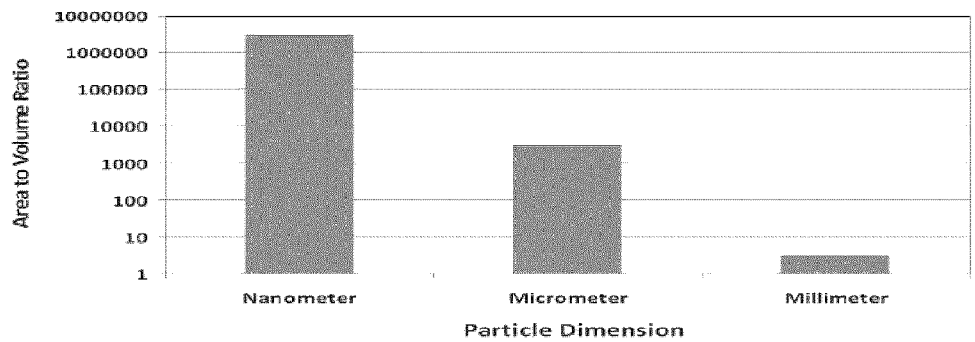
FIG. 3 shows surface area to volume ratio of the same volume of materials.[10]

In one aspect described herein, the fluid is a drilling fluid having nanoparticles (NP) and granular particles (GP) for strengthening of the wellbore in a formation. The nanoparticles and granular particles are smaller than loss circulation materials (LCM) but act in a similar manner as LCM, plugging fractures. This isolates the fracture tip from the fluid pressure which then controls the fracture propagation and ultimately increases the hoop stress around the wellbore. In a further aspect, the drilling fluid is an aqueous based or invert emulsion-based drilling fluid. In a further aspect, the nanoparticles are hydroxide, oxide, sulphate, sulphide, and carbonate nanoparticles. The nanoparticles are present in the fluid in low amounts. As a result, the nanoparticles do not significantly alter the other characteristics of the fluid.

The particles in the fluids are not LCM. LCM have larger particle sizes. Smaller particles such as the granular particles and nanoparticles used herein were previously thought to plug pore throats and be effective in stopping matrix seepage but were not desirable in plugging fractures and maximizing fluid loss in fracture propagation treatments.[6] As such they were thought to be ineffective in the strengthening of the wellbores.

Instead, it has now been found that these particles bridge the openings of fractures and strengthen the wellbore. Bridging of openings is based on the plugging mechanism. The particles form a uniform block between the fracture planes. Properties of the block change with particle type, concentration, size distribution and size range as well as the fracture geometry. Once the particle block is formed, it is under compression. The friction force between the fracture surfaces and the sides of the particle block determines the pressure required to remove the block. Once the block is removed, the flow of drilling fluid to the fracture continues. The pressure required to remove the block is the average peak pressure $P_{P-ave}$. To estimate the average peak pressure during particle plugging, the following equation can be used which uses the mechanical properties of the solid constituents of the drilling fluid:

$$P_{P-ave} = 2\mu_{sf} E_P \left( \frac{D^*}{W_f} - 1 \right)$$

where the $E_p$ is the strain of the particle block, $D^*$ is the original particle diameter, $W_f$ is the fracture width, and $\mu_{sf}$ is the static frictional coefficient of the fracture planes.[12]

One aspect described herein is a drilling fluid comprising an invert emulsion base fluid, about 5.0 wt % or less nanoparticles, and about 10.0 wt % or less granular particles. It is believed that the particles strengthen the wellbore by plugging fractures, thereby controlling fracture propagation.

In a further aspect, there is described a use for the fluid for strengthening the wellbore. In a further aspect, the fluid is a drilling fluid and the wellbore is strengthened during drilling of a well in the formation.

In a further aspect, the drilling fluids are prepared using ex situ and in situ methods for preparing the nanoparticles contained in the drilling fluids.

In one aspect, there is described a method of making the NP/GP containing drilling fluid by forming the nanoparticles ex situ, comprising the steps of providing aqueous-based precursor solutions for forming the nanoparticles, mixing the precursor solutions under high shear, and adding the mixed precursor solution to the well fluid, and either before or after the formation of the nanoparticles adding the granular particles and subjecting the fluid to mixing and shear, to form the NP/GP-containing fluid, wherein the particles strengthen the wellbore.

In a further aspect, there is described a method for making the NP/GP-containing fluid by forming the nanoparticles in situ, comprising the steps of providing aqueous-based precursor solutions for forming the nanoparticles, adding the precursor solutions to the fluid, and subjecting the fluid to mixing and shear to form the nanoparticle-containing fluid, and either before or after the formation of the nanoparticles adding the granular particles and subjecting the fluid to mixing and shear, to form the NP/GP-containing fluid, wherein the particles strengthen the wellbore.

In a further aspect, the nanoparticles are formed in situ in the fluid using powder precursor salts for forming the nanoparticles.

The base fluid of the present drilling fluid can be a well completion fluid and in a further aspect, is a drilling fluid, kill fluid, pre-stimulation fluid, or completion fluid. In a further aspect described herein, it is a drilling fluid and in particular, an invert emulsion drilling fluid. These fluids, and in particular drilling fluids, are well known in the art.

In one aspect, the drilling fluids are invert emulsion fluids. Hydrocarbon based drilling emulsions contain a large amount, i.e. 95%, of hydrocarbon based material (oil) as the continuous phase of the emulsion. The remainder of the emulsion is a minor amount of an aqueous phase as the discontinuous phase of the emulsion. Invert emulsions are a type of water-in-oil emulsions which use hydrocarbon-based materials but which contain smaller amounts of the hydrocarbon-based material in the continuous phase and larger amounts of the aqueous discontinuous phase as compared to other hydrocarbon-based fluids.

The drilling fluids may contain a number of common additives such as weighting agents, emulsifiers, foaming agents, etc. The NP/GP particles are selected so that they do not affect the other characteristics of the drilling fluid.

The present fluid is an economic and effective method of strengthening the wellbore in an underground formation. This is particularly effective when mud weight required for well control and to maintain a stable wellbore exceeds the fracture resistance of a formation or a portion of a formation. It is a particular problem in a depleted reservoir. By plugging the fracture, the particles isolate the fracture tip from the fluid pressure and control fracture propagation. This increases the stress of the wellbore and allows the use of a higher mud weight through the strengthened wellbore.

Nanomaterials are a good candidate for drilling fluid design because of their very good physiochemical, thermal, electrical, hydrodynamic and interaction properties. A nano sized particle physically has dimension equal to one billionth of a meter.[9] These very fine particles can gain easy access to the smallest of pores and pore throats acting as very effective sealants to all types of formations including unconsolidated, shaly and naturally fractured formations. Addition of nanoparticles to drilling mud greatly improves its filtration properties forming thin, non-erodible and impermeable filter cake. The resultant filter cake can also be easily removed before well completion because of the huge surface area to volume ratio of the nanoparticles which allows for extensive interaction with the mud. The sponge like clustering due to their high aggregation of surface area to volume ratio also makes them very applicable to completion fluid design as this feature helps prevent fluid invasion and consequently formation damage.[10]

The key advantage nano sized materials have over micro and macro sized particles is their far greater higher surface area to volume ratio. This attractive property gives nanoparticles unrestricted access to the finest of pore spaces of near wellbore formations, sealing fractures and naturally fractured formations, and makes them particularly useful in:

Eliminating shale-mud interaction while drilling due to the their high interaction potentials Improve thermal conductivity of drilling fluid which leads to efficient bit cooling and high mobility.

Reduces the wear and tear of down hole equipment due to its very low kinetic energy.

Preventing borehole instability and lost circulation problems due to their sealing and strengthening potentials.

It is also environmentally friendly because only a very small quantity is needed for mud additives (typically <1%).

It is contained within a liquid phase, as opposed to a powdery form.

In addition to strengthening the wellbore, the nanoparticles provide one or more of the following advantages. The nanoparticle-containing fluids reduce fluid loss into the formation as compared to fluids without the nanoparticles. The nanoparticles form a thin and firm filter cake in the formation. They cause minimal formation damage. They are stable at extremely high temperatures. The nanoparticles are present in the fluids at low concentrations and may be used without other LCM. Since less fluid is lost to the formation, the cost of the fluid is lower. The nanoparticles result in lower torque and drag, thereby increasing the extended reach of the well. Since a lower concentration of nanoparticles is used, there is less formation damage, no significant changes to the characteristics of the fluid, and an increased productivity index. The nanoparticles may also be effective at reducing fluid loss in both low temperature low pressure environments and high temperature high pressure environments.

In one aspect, the nanoparticles are selected from metal hydroxides, e.g. iron hydroxide, metal oxides, e.g. iron oxide, metal carbonates, e.g. calcium carbonate, metal sulfides, e.g. iron sulfide, and metal sulfate, e.g. barium sulfate. In a further aspect, they are metal hydroxides such as iron hydroxide. In some cases, the specific nanoparticles may form under formation conditions. For example, iron hydroxide may convert to iron oxide under high temperature high pressure conditions. If the selected nanoparticles are sulfide or sulfate nanoparticles, they may also act as weighting material.

Very low levels of nanoparticles in drilling fluid will substantially reduce fluid loss to the formation, even without other LCM being present. Very low amounts are also required for wellbore strengthening.

The nanoparticles are present in the base fluid in amounts below about 5 wt %, in one aspect below about 4 wt %, in a further aspect below about 3 wt %, in a further aspect below about 2 wt %, and in a further aspect below about 0.2 wt %. Because the amount of nanoparticles is low, other additives are generally not required to stabilize the particles although in some water-based drilling fluids, surfactant or polymeric additives may be required. Further, the nanoparticles do not agglomerate in the fluid even after several weeks.

In one aspect, the nanoparticles have a particle size in the range of 1-300 nm, in a further aspect 1-120 nm and in a further aspect, the majority or most of the nanoparticles have a particle size in the range of 1-30 nm. In a further aspect, substantially all of the nanoparticles have a particle size is the range of 1-30 nm.

The particle sizes of the nanoparticles are not limited to these specific ranges. The particle size will vary in accordance with the specific base fluid and in particular, the invert emulsion drilling fluid. The water droplets in the invert emulsion of the drilling fluid provide control over the particle sizes and therefore the nanoparticle sizes can be varied according to the diameter of the water pools in the invert emulsion. Any surfactants in the fluid will also influence the nanoparticle size since the surfactants tightly hold the water pools in the oil phase.

The granular particles in the drilling fluid can be any granular particle ordinarily used in such fluids. These include, for example, walnut shells, peanut shells, coconut shells, shredder paper, graphite, calcium, carbonate, and mica. In one aspect of the fluid, the granular particles are graphite and calcium carbonate. The particular granular particle is selected with consideration of several factors including strengthening performance, low formation damage, easy removal during completion and production, cost and availability near the well location.

Although previous studies have shown that high concentrations of particles as required, it has been found that low concentrations are sufficient for well strengthening. In one aspect, the granular particles are present in the fluid in an amount of less than 10.0 wt %, in a further aspect less than 1.0 wt %, and in a further aspect are present in an amount less than 0.1 wt %.

One benefit of using low concentrations of the particles is that the particles do not significantly affect other characteristics of the fluid. In particular, after the addition of the particles, there should be no significant change in the specific gravity, apparent viscosity, pH, or mud weight of the fluid. There will also be no significant change in the rheology of the fluid.

Particle size and particle size distribution depends on a number of factors including the details of the formation (including its properties and morphology), dimensions of the fractures, and particle properties. It is not necessary for the granular particle size to be uniform. However, several studies have shown that a wide particle size distribution is preferred. It has been estimated that the particle size distribution should have a $D_{50}$ equal to the fracture opening.[12] It has also been found that the fluid should include particles that are larger than the fracture opening as well as smaller particles.[12] The combination of these particles increases the bridging and sealing effects in the fractures. In one aspect of the fluids tested, the granular particles have a particle size of up to 250 μm.

The particles in the drilling fluid plug fractures occurring in the wellbore. This isolates the fracture tip from the fluid pressure. This controls the fracture propagation and strengthens the wellbore. This allows the use of drilling muds with higher weights through the strengthened wellbore. The particles in the present fluids allow for some leakage of the fluid since this forces the particles to stick to the formation. The higher the fluid flow through the fracture results in a higher deposit of the particles and more strengthening of the formation. Further, the mixture of particles in the present fluid allow for uniform continuous plugging of both small and large fractures, leaving no weak spots in the overall structure of the wellbore. This provides more strengthening to the formation. The mix of the micro and nano particles in the present fluid is able to provide such a blend.

The drilling fluid can be used in a variety of formations. It can be used in formations where fractures are generated from high mud weight in either permeable or impermeable formations, in formations where there exists naturally fractured smaller networks or larger natural fractures, and it can be used in formations with smaller pore sizes and in particular, formations having pore openings smaller than 100 μm.

In a further aspect, there is described a method of making the drilling fluid containing the GP/NP. The nanoparticles in the fluid can be formed using either an in situ or ex situ process.

The nanoparticles can be formed and suspended in situ in the drilling fluid. This eliminates the need to pre-form the nanoparticles. In this method, precursors of the nanoparticles are prepared, in one aspect as aqueous solutions. Selecting appropriate precursors is within the common knowledge in this field, according to the desired nanoparticle. The precursor solutions are added to the prepared drilling fluid and mixed. Shear is applied to the drilling fluid to ensure mixing of the nanoparticles precursors and complete formation of the nanoparticles in the drilling fluid. The nanoparticles may also be formed from powder precursor salts.

It is thought that this in situ method uses the dispersed water pools of the invert emulsion drilling fluid as nano-reactors to form the nanoparticles. The in situ-formed nanoparticles may provide improved fluid loss reduction over fluids having nanoparticles formed ex situ.

In the ex situ process, the nanoparticles are pre-formed from their precursors. Precursors, in one aspect in aqueous precursor solutions, are mixed and high shear applied. The formed nanoparticles are then added to the prepared drilling fluid. The fluid and nanoparticles are mixed. The granular particles may be added to the fluid before or after formation and/or addition of the nanoparticles.

In one example of the ex situ method, an invert emulsion drilling fluid having iron (III) hydroxide as the nanoparticle is formed, where the fluid has lower fluid loss in a drilling operation. The fluid is formed by the steps of solubilizing a desired amount of an anhydrous iron (III) chloride powder, adding a stoichiometric amount of sodium hydroxide pellets, mixing the solution at 25° C., recovering the iron (III) hydroxide nanoparticles and forming a bulk aqueous solution of nanoparticles, mixing the nanoparticles solution in the invert emulsion drilling fluid in a slurry to form the nanoparticle-containing drilling fluid. The granular particles may be added to the fluid before or after formation of the nanoparticles.

In an example of the in situ method, the iron (III) hydroxide nanoparticles were prepared within the invert emulsion fluid, starting from $FeCl_3$ and NaOH precursors. With the low amount of nanoparticles added of about 1 wt %, no impact on drilling fluid specific gravity, apparent viscosity and pH was observed. Again, granular particles may be added to the fluid before or after the formation of the nanoparticles.

EXAMPLES

The NP/GP containing drilling fluids were tested in hydraulic fracture experiments to show the sealing properties of the blend and determine optimum blends. Minimum distortion in drilling fluid rheological properties and gel strength was also considered in the blend design. The present testing compares the sealing properties of different blends of in-house prepared nanoparticles and commercially available nanoparticles to determine optimum performing blends. It also looks at the optimal concentration ratio with the available particle size distribution.

Hydrocarbon-based, invert emulsion, and water-based drilling fluids each have distinct characteristics. Addition of particles to a water-based drilling fluid may have different and/or contrary effects when added to an invert emulsion or hydrocarbon-based fluid, since the driving forces for colloid dispersion, deposition and aggregation are different. Therefore, the effect of NP and/or GP blends in water-based muds is not necessarily the same effect achieved when these particles are added to invert emulsion based drilling fluids.

In the present application, testing on water-based muds is used to identify optimum selection of GP and NP and optimum concentrations of the particles. This selection is then tested using invert emulsion fluids as the base fluid. The testing shows that the trends identified in the water-based muds are also seen in the invert emulsion fluids and therefore it can be concluded that the invert emulsion fluids containing the NP/GP blends and concentrations have similar well strengthening characteristics as the water-based muds.

The experiments were carried out with hydraulic fracture pressure cell apparatus and the experimental design, parameters and results are summarized below.

To obtain the cores, core slabs were obtained from sandstone outcrop quarries. Cylindrical cores were drilled out with a 5¾" bit from a slab using a drill press. The core cylindrical surface (both sides) was cut with a slab saw. The cut surface was ground with a surface grinder until the surface was flat. A borehole was drilled in the center of the core with ½" drill bit using the drill press. Cylindrical steel caps were fixed on either side of the core using epoxy gel. The core was vacuumed for 24 hours in a vacuum chamber. Water was run in to the vacuum chamber and the core soaked for 3 hours.

In the hydraulic fracture operations, the prepared core was placed in the hydraulic fracture pressure cell. The core was coupled to the apparatus according to specifications. Hydraulic fluid was mixed and pumped into the core until it fractured. The pressure readings were monitored and recorded using Lab View Iscopump™ software.

Experimental Design Statistical Analysis Procedure

A two factorial Analysis (2-way Anova) experimental design was used for these experiments. The main effects (GPs and NPs) were analyzed as well as their interactive effect on the Yield response which is the Wellbore Fracture Pressure. The Tukey procedure was used for pairwise comparison. Based on the results from the Tukey analysis, optimum GPs and NPs giving improved yield responses were selected. The interactive plot analysis was used to determine an optimum concentration combination for the selected GPs and NPs. The rheological and filtration properties of the selected GPs and NPs were assessed to ascertain the impact on fluid rheology.

Experimental Strategy

Water based and Oil based mud were prepared and their rheological and filtration properties measurement taken. Both muds were tested with the sandstone cores and the Wellbore strengthening measurements taken. Using statistical analysis, experiments were conducted to test the statistical significance of drilling fluid type (oil based and water based mud). The GPs/NPs combination that gave the best result for Wellbore Strengthening test were repeated once to test for repeatability of the experiment.

Example 1

Fractures were created during the testing and the fracture width was an uncontrolled parameter in the testing.

Figure 4:
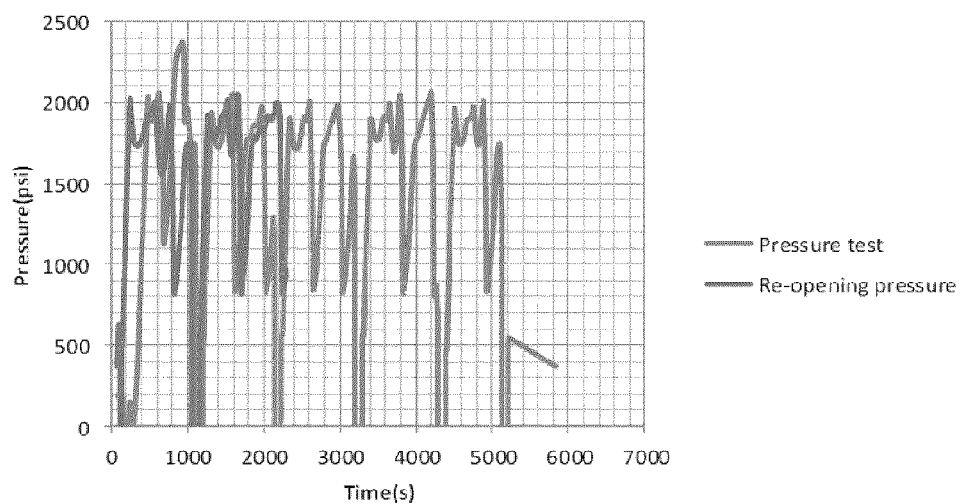
FIG. 4 is a graph showing the fracture breakdown pressure and re-opening pressure using spud mud (control sample).
Figure 5:
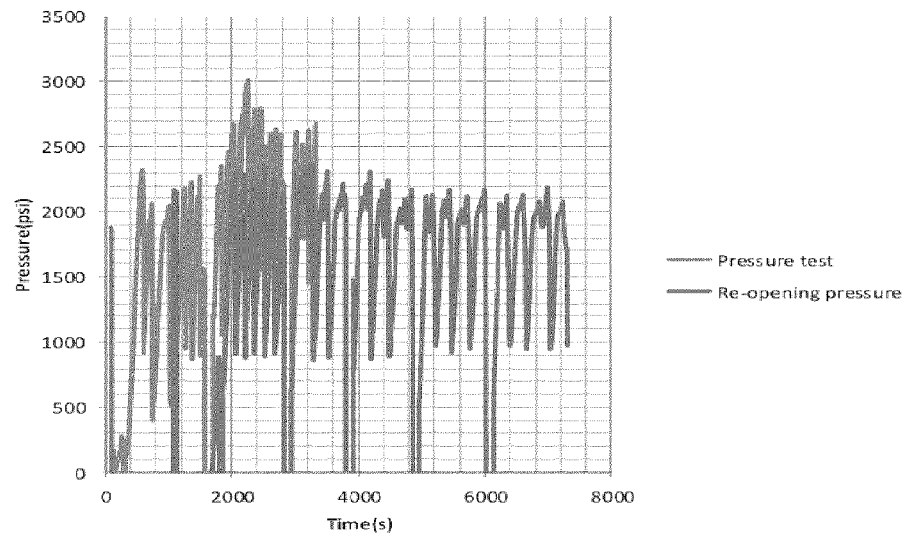
FIG. 5 is a graph showing the fracture breakdown pressure and re-opening pressure using NP2 blend fluid.
Figure 6:
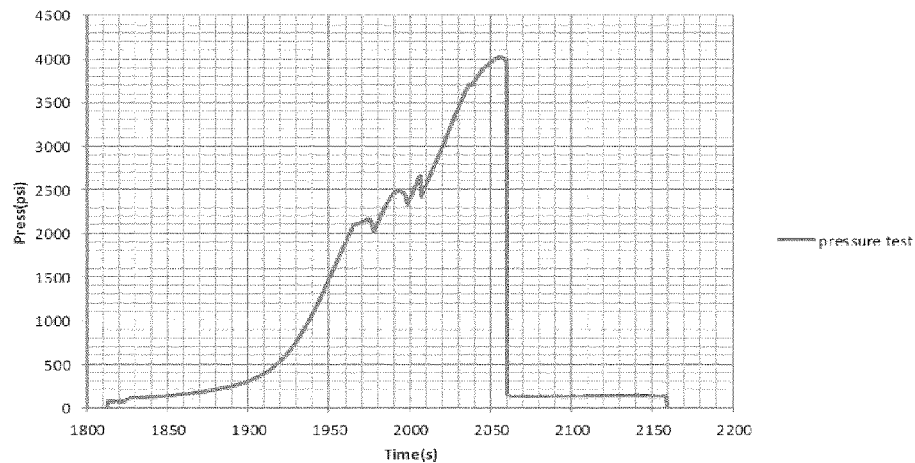
FIG. 6 is a graph showing the fracture breakdown pressure using the NP1 blend fluid.

The core used in the testing for data shown in FIGS. 4 to 6 was a sandstone core (Roubidoux sandstone) which was 5.75" in diameter, 0.5" borehole diameter and the height varied, with a maximum height of 9". The confining pressure was 100 psi, the overburden pressure was 400 psi and the testing was carried out at room temperature. Spud mud (bentonite and water) was used as a control sample.

The composition of the NP/GP in the drilling fluid varied in the testing. The drilling mud was a water based mud. The granular particles were graphite, and the nanoparticles included calcium carbonate and iron (III) hydroxide. The nanoparticles may be commercial sourced or prepared in situ in the drilling mud. In this testing, the nanoparticles were prepared in house and added to the fluid.

Tests run using a control sample of spud mud, NP1 blend fluids, and NP2 blend fluids are shown in FIGS. 4 to 6 respectively. The composition of these fluids and their rheology are set out below in Tables 1 to 3.

TABLE 1

| Control Sample Composition | Control Sample Rheology |
|---|---|
| Mass of bentonite clay: 30 g<br>Mass of water: 470 ml | Density 8.8 lbs/gal<br>Plastic Viscosity (PV) 10 cp<br>Yield Point (YP) 10 lb/100 ft$^2$<br>10 sec gel strength 9 lb/100 ft$^2$<br>10 min gel strength 20 lb/100 ft$^2$ |

TABLE 2

| NP1 Blend Composition | NP1 Blend Rheology |
|---|---|
| In-house Iron (III) hydroxide<br>NPs: 5 ml (low conc.)<br>Graphite: 5 g (high conc.)<br>Mass of water: 460 ml | Density 6.4 lbs/gal<br>Plastic Viscosity (PV) 25 cp<br>Yield Point (YP) 25 lb/100 ft$^2$<br>10 sec gel strength 30 lb/100 ft$^2$<br>10 min gel strength 55 lb/100 ft$^2$ |

TABLE 3

| NP2 Blend Composition | NP2 Blend Rheology |
|---|---|
| In-house Calcium Carbonate<br>NPs: 5 ml (low conc.)<br>Graphite: 5 g (high conc.)<br>Mass of water: 460 ml | Density 6.4 lbs/gal<br>Plastic Viscosity (PV) 22 cp<br>Yield Point (YP) 40 lb/100 ft$^2$<br>10 sec gel strength 41 lb/100 ft$^2$<br>10 min gel strength 64 lb/100 ft$^2$ |

Discussion of Results

FIGS. 4 to 6 clearly show that the NP1 blend had the highest fracture gradient of 4,014 psi. This is a significant fracture gradient gain of 1,634 psi over the fracture gradient achieved with the unblended (spud) mud with a fracture gradient of 2,380 psi. The plots also show that the NP2 blend had a fracture breakdown pressure of 3,000 psi which is a fracture gradient increase of 620 psi over the fracture breakdown pressure achieved with the unblended (spud) mud.

The core was given ten minutes to heal before commencing with the re-opening pressure test and the NP2 blend fracture re-opening pressure was 300 psi more than that of the unblended (spud) mud.

Initial tests show that both NP1 and NP2 blends gave significant increases in fracture gradient with NP1 blend strengthening the wellbore by about 1,000 psi more than the NP2 blend.

Both the NP1 and NP2 blend reduced the density of the unblended (spud) mud while more than doubling the viscosity and yield point respectively as can be seen from Tables 1 to 3 above.

These results show that a blend of NP/GP materials can strengthen the wellbore by increasing the fracture gradient considerably.

Example 2

Further testing was carried out in a similar manner as set out above but using Roubidoux sandstone cores and concrete cores. Again, the fracture width was an uncontrollable parameter. The core had a diameter of 5.75", 9" maximum height and 0.5" borehole diameter. The confining pressure was 100 psi and the overburden pressure was 400 psi. The testing was carried out at room temperature.

Table 4 below shows the fracture fluid mixture blends for the tested water based fluids.

TABLE 4

| Blend type | Bentonite | Water | NP1 | NP2 | Graphite (A) | CaCo$_3$ (B) | Set conc. % |
|---|---|---|---|---|---|---|---|
| Control | 30 g | 470 ml | — | — | — | — | — |
| Blend 1 | 30 g | 468.5 ml | 1 ml | — | 0.5 g | — | NP1(L), A(L) |
| Blend 2 | 30 g | 455.5 ml | 10 ml | — | 0.5 g | — | NP1(H), A(L) |
| Blend 3 | 30 g | 464 ml | 1 ml | — | 5 g | — | NP1(L), A(H) |
| Blend 4 | 30 g | 455 ml | 10 ml | — | 5 g | — | NP1(H), A(H) |
| Blend 5 | 30 g | 468.5 ml | — | 1 ml | 0.5 g | — | NP2(L), A(L) |
| Blend 6 | 30 g | 467.5 ml | — | 10 ml | 0.5 g | — | NP2(H), A(L) |
| Blend 7 | 30 g | 464. ml | — | 1 ml | 5 g | — | NP2(L), A(H) |
| Blend 8 | 30 g | 455 ml | — | 10 ml | 5 g | — | NP2(H), A(H) |
| Blend 9 | 30 g | 464 ml | 1 ml | — | — | 5 g | NP1(L), B(H) |
| Blend 10 | 30 G | 455 ml | — | 10 ml | — | 5 g | NP2(H), B(H) |

The concentration percentage levels for both NPs and GPs were as follows:

| Nanoparticles (NP1, NP2) | Granular Particles (A, B) |
|---|---|
| Low (L) = 0.2 wt %<br>High (H) = 2.0 wt % | Low (L) = 0.1 wt %<br>High (H) = 1.0 wt % |

Figure 7:
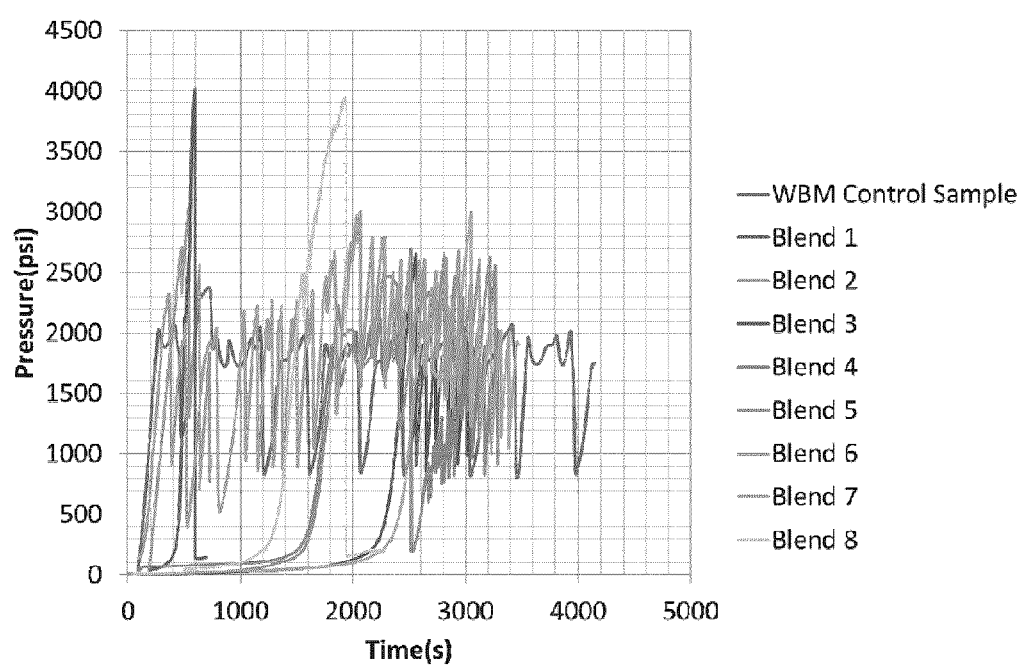
FIG. 7 shows the fracture breakdown pressures for the various water based mud blends for the control sample and blends 1 to 8.

FIG. 7 shows the fracture breakdown pressures for the various water-based fluid blends for the control sample and blends 1 to 8.

Table 5 below shows the breakdown pressures and the percent increase of breakdown pressures of blended fluids over unblended control sample fluids for water-based fluids.

TABLE 5

| DF Type | Control | Blend 1 LL | Blend 2 HL | Blend 3 LH | Blend 4 HH | Blend 5 LL | Blend 6 HL | Blend 7 LH | Blend 8 HH | Blend 9 | Blend 10 |
|---|---|---|---|---|---|---|---|---|---|---|---|
| Breakdown pressure (psi) | 2,372.8 | 2,651 | 3,060 | 4,041 | 2,700 | 2,651 | 3,007 | 3,010 | 3,938 | 2,699 | 2,693 |
| Increase in breakdown pressure (psi) | — | 278.2 | 687.2 | 1,668.2 | 327.2 | 278.2 | 634.2 | 637.2 | 1,565.2 | 326.2 | 320.2 |
| Increase over unblended DF (%) | — | 11.72 | 28.96 | 70.31 | 13.79 | 11.72 | 26.73 | 26.85 | 65.96 | 13.75 | 13.49 |

These results show that for the tested blends, blend 3 had better results for the NP1-A combination while blend 8 had better results for the NP2-A combination. NP1-A does not give as good results at high concentrations for both NP and GP (HH). There was no noticeable difference in the NP2-A results for blends 6 and 7. Both combinations gave the same minimal results at low concentrations for both NP and GP (LL).

The NP-A (graphite) optimal combinations did not give as good results as when tested with B ($CaCO_3$). However, the B results show the same pressure trend as A optimal results.

Table 6 below shows the rheological properties of the blended fluids and unblended control sample for the water-based fluids.

TABLE 6

| DF Type | Control | Blend 1 LL | Blend 2 HL | Blend 3 LH | Blend 4 HH | Blend 5 LL | Blend 6 HL | Blend 7 LH | Blend 8 HH | Blend 9 | Blend 10 |
|---|---|---|---|---|---|---|---|---|---|---|---|
| Mud Density (lb/gal) | 8.8 | 6.1 | 6.5 | 6.0 | 6.6 | 6.4 | 6.2 | 6.4 | 6.1 | 6.0 | 6.1 |
| Plastic Viscosity (cp) | 10 | 8 | 7 | 24 | 8 | 10 | 4 | 22 | 23 | 15 | 7 |
| Yield Point (lb/ft$^2$) | 10 | 26 | 51 | 28 | 55 | 22 | 44 | 40 | 54 | 30 | 41 |
| 10 sec gel strength (lb/100 ft$^2$) | 9 | 16 | 33 | 28 | 38 | 20 | 38 | 41 | 48 | 28 | 39 |
| 10 min gel strength (lb/100 ft$^2$) | 20 | 24 | 34 | 39 | 38 | 25 | 52 | 64 | 66 | 36 | 59 |

These results show that blend 3 provided better results for water-based fluids, based on the fracture pressure and rheology. Mud property indicators for favorable results appear to be plastic viscosity and the 10 min gel strength of the blended mud. Mud/fluid density did not appear to have any impact on the strengthening results.

Figure 8:
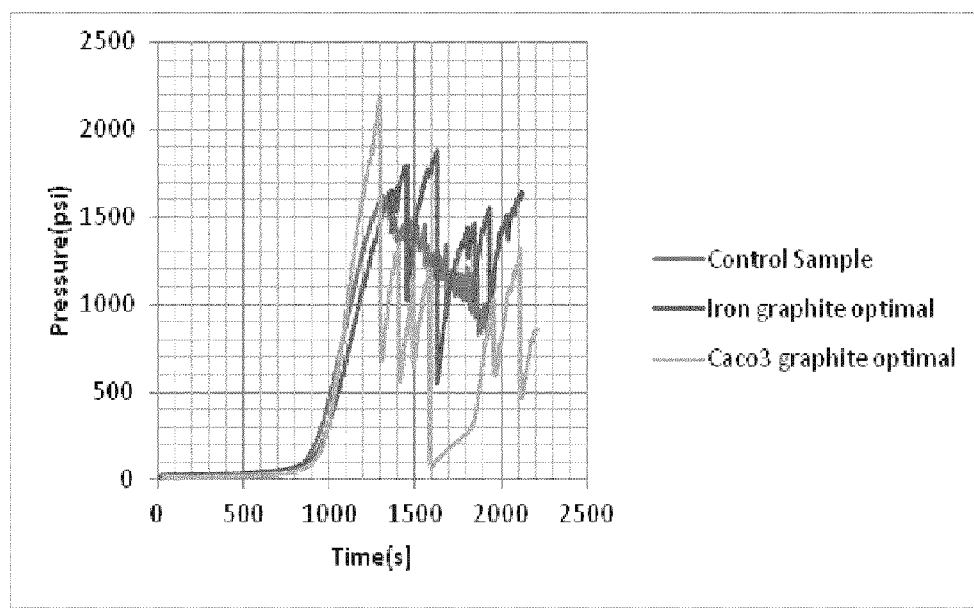
FIG. 8 shows the fracture breakdown pressures for invert emulsion (diesel oil) mud blends.

FIG. 8 shows the fracture breakdown pressures for invert emulsion (diesel oil) fluid blends.

Table 7 shows the breakdown pressures and the percent increase of breakdown pressure of blended invert emulsion fluids over unblended invert emulsion fluids, using the blends taken from the water based fluid with the best results.

TABLE 7

| DF Type | Unblended Invert DF | Iron graphite optimal blend | $CaCo_3$ graphite optimal blend |
|---|---|---|---|
| Breakdown pressure(psi) | 1,612.6 | 1,878.0 | 2,199.4 |
| Increase in Fracture pressure(psi) | — | 265.4 | 586.8 |

TABLE 7-continued

| DF Type | Unblended Invert DF | Iron graphite optimal blend | $CaCo_3$ graphite optimal blend |
|---|---|---|---|
| % increase over unblended DF | | 16.46 | 36.39 |

Table 8 shows the rheological properties of these unblended invert emulsion fluids and blended invert emulsion fluids.

TABLE 8

| DF Type | Unblended invert DF | Iron graphite optimal blend | $Caco_3$ graphite optimal blend |
|---|---|---|---|
| Mud Density (lb/gal) | 7.65 | 7.7 | 7.4 |
| Plastic Viscosity (cp) | 22 | 23 | 32 |
| Yield Point (lb/ft$^2$) | 3 | 5 | 14 |
| 10 sec gel strength (lb/100 ft$^2$) | 2 | 2 | 6 |
| 10 min gel strength (lb/100 ft$^2$) | 3 | 4 | 12 |

Based on these results, blend 8 shows improved results for invert emulsion fluids. It exhibited double the response as that using blend 3.

Figure 9A:
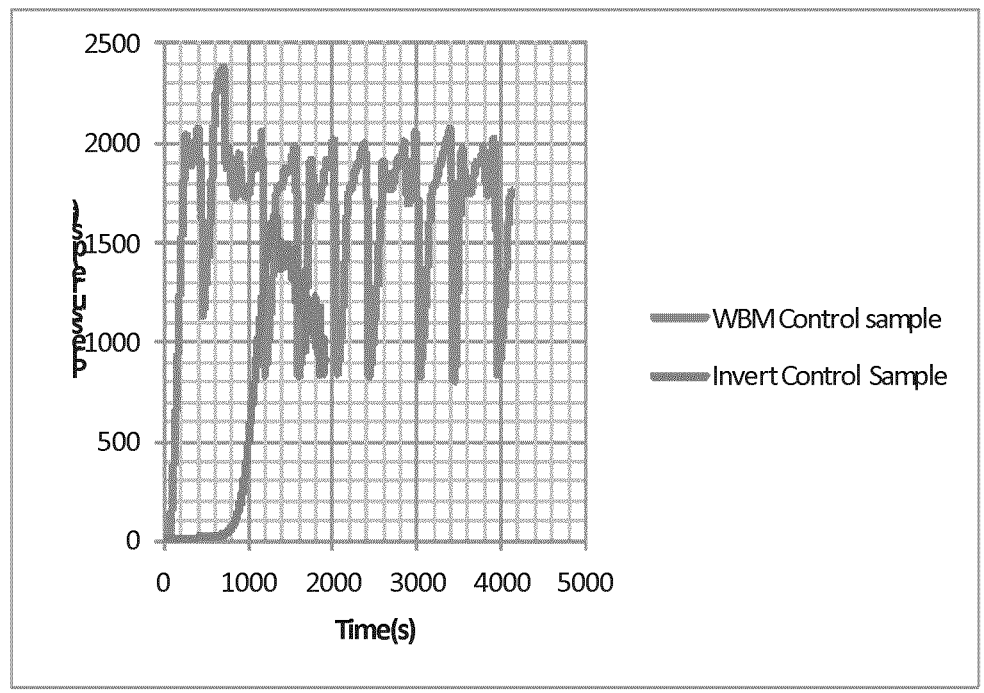
FIGS. 9a and 9b show the differences in breakdown pressure between a water based mud and an invert emulsion based mud.
Figure 9B:
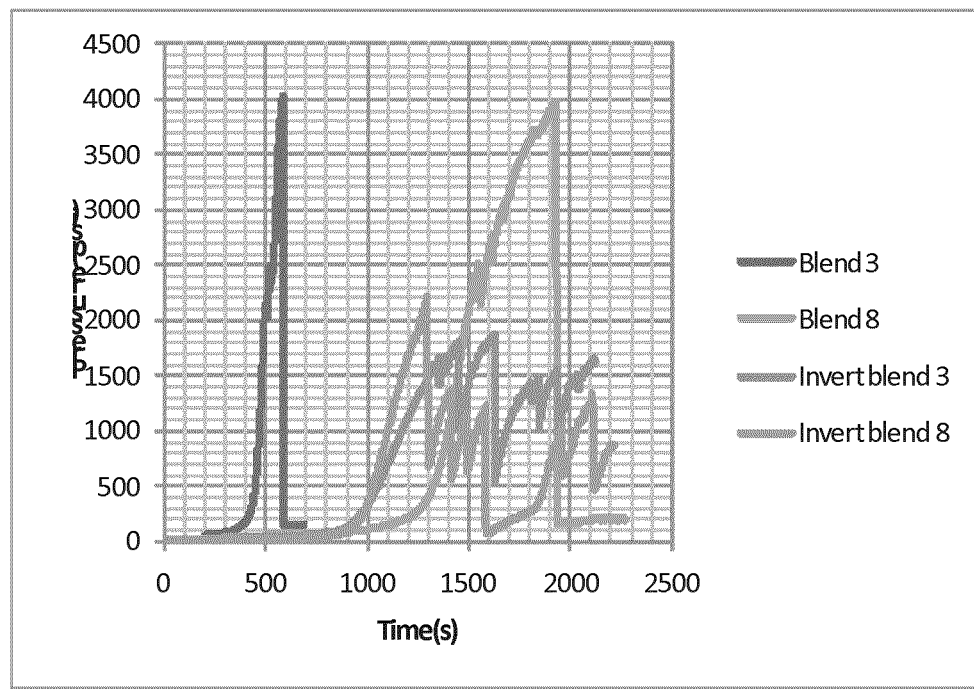

FIG. 9 shows the differences in breakdown pressure between a water-based mud and an invert emulsion-based mud. The results are set out below in Table 9:

TABLE 9

| DF Type | Invert emulsion DF | Water based DF |
|---|---|---|
| Fracture breakdown pressure (psi) | 1,612.6 | 2,372.8 |
| Difference in Fracture breakdown pressure (psi) | — | 760.20 |
| Percentage difference (%) | — | 47.14 |

The rock properties of the tested cores are set out below in Table 10:

TABLE 10

| Core number | K(md) | Φ (%) | Tensile strength(psi) |
|---|---|---|---|
| Core 1 | 54.83 | 11.04 | 667.17 |
| Core 3 | 95.65 | 14.33 | 140.69 |
| Core 4 | 262.77 | 12.25 | 306.03 |
| Core 5 | 106.18 | 13.10 | 278.47 |

Figure 10:
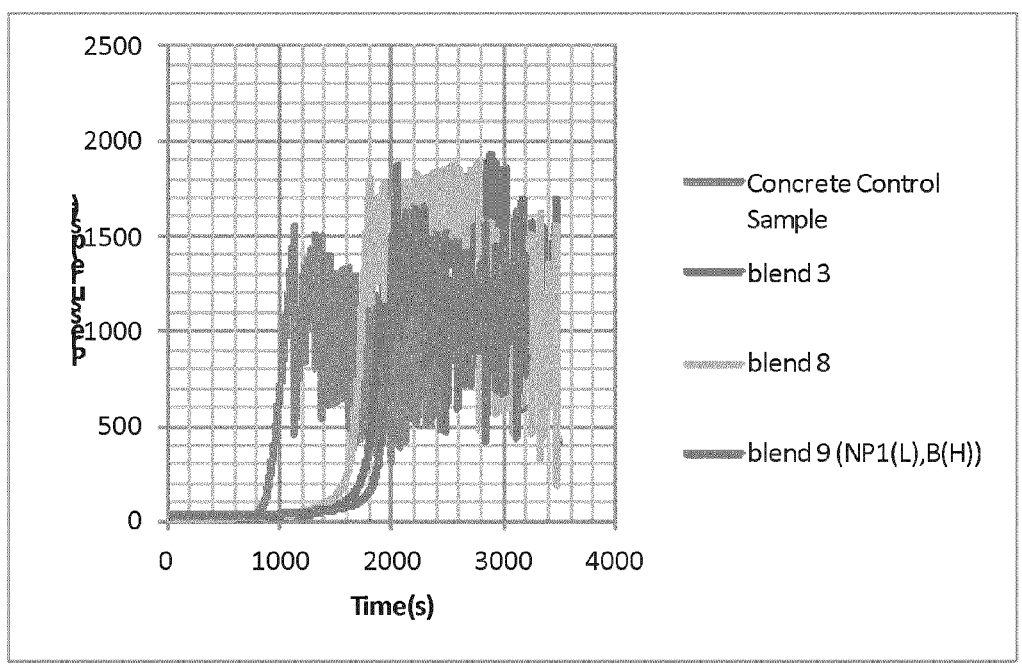
FIG. 10 shows the fracture breakdown pressure in the concrete test.

The concrete test result analysis (impermeability test) is found in FIG. 10. FIG. 10 shows the fracture breakdown pressure in the concrete test. The results are consistent with the sandstone core test. In this data, blends 3 and 8 had similar responses with very stable fracture propagation pressures. Blend 9 had a lower fracture pressure with a lower, less stable propagation pressure.

Table 11 shows the fracture breakdown pressure and the percent increase in fracture breakdown pressure of blended water-based fluids over unblended control fluids in impermeable concrete.

TABLE 11

| DF Type | Control | Blend 3 | Blend 8 | Blend 9 |
|---|---|---|---|---|
| Fracture breakdown pressure(psi) | 1,543.2 | 1,923.4 | 1,889.6 | 1,867.0 |
| Increase in Fracture breakdown pressure (psi) | — | 380.2 | 346.4 | 323.8 |
| Increase over unblended DF (%) | — | 24.64 | 22.45 | 20.98 |

As shown in this data, an approximately 25% increase in the fracture pressure is achieved in a totally impermeable core. These results show the applicability of these blends for wellbore strengthening in impermeable rock formations. It also confirms the importance of leak off in wellbore strengthening.

Figure 11:
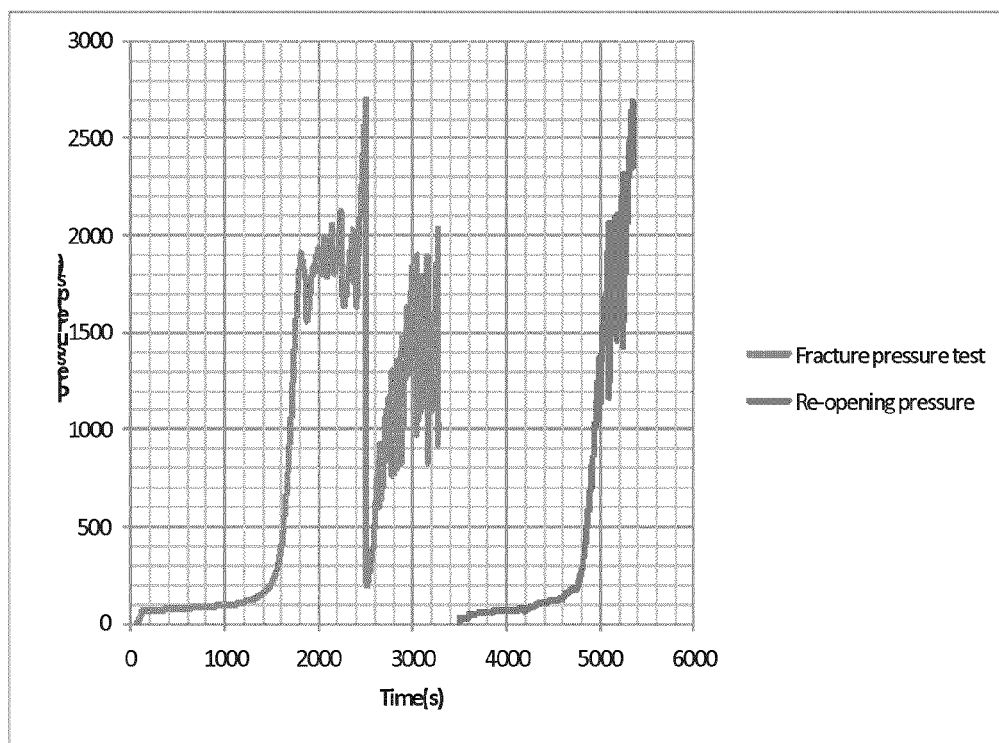
FIGS. 11 and 12 show the sealing effects of the fluids on fractures in a sandstone core (FIG. 11) and a concrete core (FIG. 12).
Figure 12:
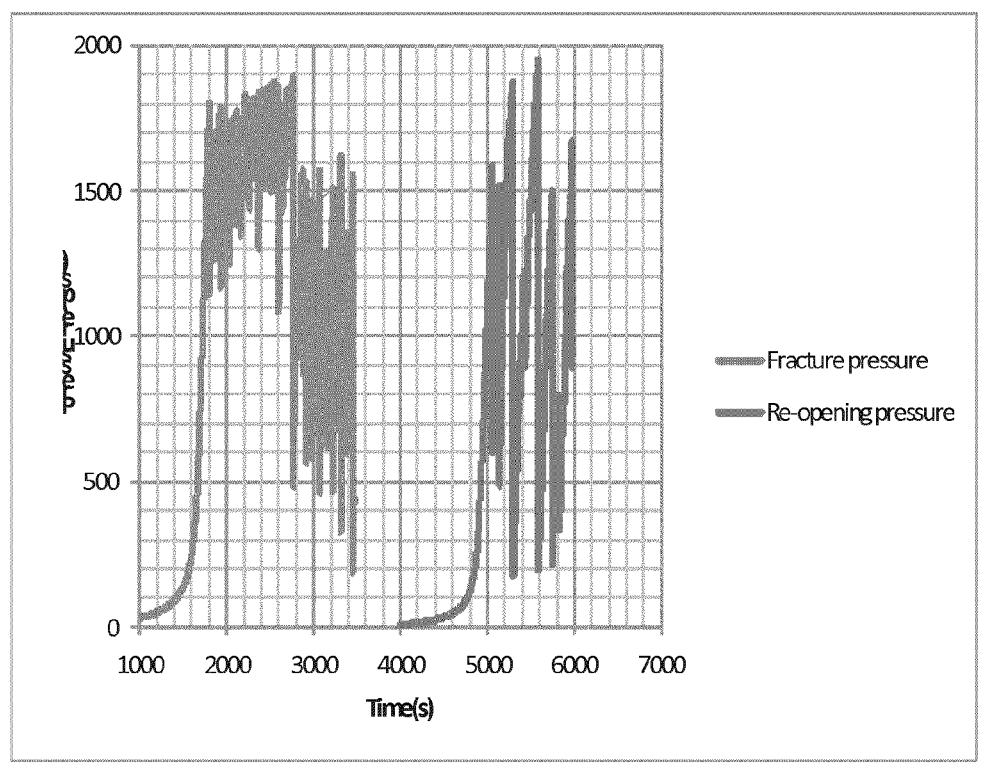

The results also showed absolute sealing effects of the fluids. FIG. 11 shows that blend 4 totally seals the fracture in the sandstone core, causing the re-opening of the fracture to create a second vertical fracture. In FIG. 12, blend 8 totally sealed the fracture in the concrete core, causing the re-opening of the fracture to create a second vertical fracture.

From the data set out above, some optimal combinations for water-based muds and invert emulsion-based muds have been established. For water-based muds, the blend of NP1 (Iron III hydroxide NPs) set at low concentration and Graphite (A) set at high concentration increased the fracture pressure by 1,668.20 psi or by 70.3% over the unblended water based mud with moderate impact on mud rheology.

For invert emulsion based muds, the blend of NP2 (calcium carbonate NPs) set at high concentration and Graphite (A) set at high concentration increased the fracture pressure by 586.8 psi or by 36.39% over the unblended invert emulsion (diesel oil) mud with moderate impact on mud rheology.

Plastic viscosity and 10 min gel strength are noted as important markers or indicators that show which fluid will give good wellbore strengthening results.

The results show that there are differences in the interaction of the nanoparticles with the granular particles. In the tested blends, graphite and calcium carbonate with graphite gave the best response with the NPs.

A significant difference in the breakdown pressure was noticed between water based mud and invert emulsion based mud. The water based control mud sample showed a 47.14% increase in fracture pressure over the invert emulsion mud control sample.

Absolute fracture sealing was noticed in two of the samples (sandstone and concrete) while miming the re-opening pressure cycle after waiting for 10 minutes for fracture healing to take place.

Therefore, this data clearly shows the excellent propping and sealing properties of the fluid blends.

Similar wellbore strengthening trends were noticed when testing with completely homogenous impermeable concrete core, validating the results from the sandstone core tests.

Wellbore strengthening effect was achieved in 100% impermeable concrete core achieving 24.64% increase in fracture pressure over the unblended mud. This is a clear indication that the fracturing fluid will be applicable in shale wellbore strengthening.

The impermeable test results clearly show the impact that permeability and leak-off play in achieving good wellbore strengthening results.

Adding fluid loss agents to invert emulsion or oil based mud will significantly increase wellbore strengthening efficiency of the fluid.

As shown from the above data, a skilled person may be required to determine the optimal fluid blend for a particular formation. However, this is routine and well within the capability of a technician in this industry.

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art without departing from the scope of the invention, which is defined solely by the claims appended hereto.

REFERENCES

1. Arunesh Kumar, Sharath Savari, Donald L. Whitfill, and Dale E. Jamison. "Wellbore Strengthening: The Less Studied Properties of Lost Circulation Materials." SPE ATCE. Florence, Italy, 19-22 Sep. 2010.
2. Jae H. Song, and Juan C. Rojas. "Preventing Mud Losses by Wellbore Strengthening." Russian Oil and Gas Technical Conference and Exhibition. Moscow, 3-6 Oct. 2006.
3. M S. Aston, M. W. Alberty, M. R. Mclean, H. J. de Jong and K. Armagost. "Drilling Fluids for Wellbore Strengthening." IADC/SPE Drilling Conference. Dallas, Tex., 2-4 Mar. 2004.

4. Mclean, Mark W. Alberty and Michael R. "A Physical Model for Stress Cages." SPE ATCE. Houston, Tex., 26-29 Sep. 2004.
5. Morita, N., and Fuh, G. F. "Theory of Lost Circulation Pressure." 65th Annual SPE/ATCE. New Orleans, La., 23-26 Sep. 1990.
6. Dupriest, Fred E. "Fracture Closure Stress (FCS) and Lost Returns Practices." SPE/IADC Drilling Conference. Amsterdam, Netherlands, 23-25 Feb. 2005.
7. Salehi, S., and Nygaard R. "Evaluation of New Drilling Approach for Widening Operational Window: Implications for Wellbore Strengthening." SPE Production and Operations Symposium. Oklahoma city, USA, 27-29 Mar. 2011.
8. Wang, H, Soilman, M. Y, Towler, B. F., and Shan, Z. "Strengthening a Wellbore with Multiple Fractures: Further Investigation of Factors for Strengthening a Wellbore." ARMA Conference. Asheville, Jun. 28-Jul. 1, 2009.
9. Amanullah, M. D, Mohammed, K. A, and Ziad, A. "Preliminary Test Results of Nano-based Drilling Fluids for Oil and Gas Application." SPE/IADC Drilling Conference and Exhibition. Amsterdam, Netherlands, 1-3 Mar. 2011.
10. Amanullah, M, Al-Arfaj, K. M., Al-Abdullatif, "Preliminary Test Results of Nano-Based Drilling Fluids for Oil and Gas Field Application", SPE/AIDC 139534, 1-9, (2011).
11. Amanullah, M. D, and M. Al-Tahini Ashraf. "Nano-Technology-Its Significance in Smart Fluid Development for Oil and Gas Field Application." SPE Saudi Arabia Section Technical Symposium and Exhibition. Alkhobar, Saudi Arabia, 09-11 May 2009.
12. Sensoy, T, M. E Chenevert, and M. S Mukul. "Minimizing Water Invasion in Shale Using Nanoparticles." SPE/ATCE. New Orleans, La., USA, 4-7 Oct. 2009.
13. Toroqui, Seyyad Vahidreza Mostafavi, "Experimental Analysis and Mechanistic Modelling of Wellbore Strengthening", Thesis submitted to the University of Calgary, 2011.
14. Husein. M, Zakaria. M. F, Hareland. G, "Novel nanobased drilling fluids to mitigate fluid loss" PCT Patent Application No: PCT/CA2012/050075, (2012).
15. Sensoy, T., "Use of Nanoparticles for Maintaining Shale Stability", Thesis, University of Texas, May 2009.

The invention claimed is:

1. A method of making a drilling fluid wherein nanoparticles are formed ex situ with further addition of a second particulate material, the method comprising the steps of:
   providing a base fluid;
   providing aqueous-based precursor solutions for forming the nanoparticles,
   mixing the precursor solutions for reaction to form the nanoparticles in a mixed precursor solution,
   adding the mixed precursor solution with the nanoparticles to the base fluid, and
   either before or after adding the nanoparticles, adding the second particulate material to the base fluid and subjecting the combined materials to mixing,
   the nanoparticles being provided in an amount less than 5 wt % of the drilling fluid that contains at least the nanoparticles, the base fluid, and the second particulate material,
   the second particulate material having a particle size distribution averaging in the microscale range as determined by assessment of $D_{50}$,
   the second particulate material being provided in an amount less than 10 wt % of the drilling fluid that contains at least the nanoparticles, the base fluid and the second particulate material,
   the nanoparticles and second particulate material being present, in combination, in effective amounts for strengthening a wellbore by allowing for more uniform plugging of both small and large fractures, the effective amounts including a ratio of the nanoparticles to the second particulate material providing at least about a 10% increase in fracture breakdown pressure as compared to a bentonite-based control fluid when tested on Roubidoux sandstone core material.

2. The method of claim 1, wherein the base fluid is an invert emulsion base fluid.

3. The method of claim 1 further comprising a step of adding an effective amount of a fluid loss additive.

4. The method of claim 1 wherein a majority of the nanoparticles formed in the step of mixing the nanoparticles have a particle size from 1 nm to 300 nm.

5. The method of claim 1 wherein a majority of the nanoparticles formed in the step of mixing the nanoparticles have a particle size from 1 nm to 120 nm.

6. The method of claim 1 wherein the second particulate material is selected from the group consisting of graphite, calcium carbonate, and combinations thereof.

7. The method of claim 6 wherein the nanoparticles are selected from the group consisting of metal hydroxides, metal carbonates, metal sulfites, metal sulfates, metal hydroxides, and combinations thereof.

8. The method of claim 6 wherein the nanoparticles are selected from the group consisting of iron hydroxide, iron oxide, calcium carbonate, iron sulfide, barium sulfate, and combinations thereof.

9. The method of claim 7 wherein the nanoparticles are selected from the group consisting of metal sulfides and metal sulfates, and combinations thereof.

10. The method of claim 1 wherein the nanoparticles are selected from the group consisting of, metal hydroxides, metal carbonates, metal sulfides, metal sulfates, metal hydroxides and combinations thereof.

11. The method of claim 10 wherein the nanoparticles are selected from the group consisting of metal sulfides and metal sulfates, and combinations thereof.

12. The method of claim 1 wherein the nanoparticles are selected from the group consisting of iron hydroxide, iron oxide, calcium carbonate, iron sulfide, barium sulfate, and combinations thereof.

13. The method of claim 1 wherein the nanoparticles are present in an amount less than 2 wt % of the final drilling mud.

14. The method of claim 1 wherein the nanoparticles are present in an amount less than 1 wt % of the final drilling mud.

15. A drilling fluid made according to the method of claim 1.

16. A drilling fluid made according to the method of claim 2.

17. A drilling fluid made according to the method of claim 3.

18. A drilling fluid made according to the method of claim 4.

19. A drilling fluid made according to the method of claim 5.

20. A drilling fluid made according to the method of claim 6.

21. A drilling fluid made according to the method of claim 7.

22. A method of drilling a well, comprising the steps of:
providing the drilling fluid made according to the process of claim 1; and
circulating the drilling fluid from a surface through a drill string and into a bottom of a borehole as fluid spray out of drill bit nozzles,
subsequently circulating the fluid back to the surface via an annulus between the drill string and a well hole,
in consequence of these method steps, the drilling fluid cooling down and lubricating a drill bit, removing cuttings from the hole, preventing formation damage, suspending cuttings and weighting materials when circulation is stopped, and caking off permeable formations by retarding passage of fluid into a formation through which the borehole extends.

23. The drilling fluid of claim 1 wherein the effective amounts include a weight percent ratio of the second particulate material to the nanoparticles ranging from 0.05 to 5.

24. The method of claim 1 further comprising a granular material selected from the group consisting of walnut shells, peanut shells, coconut shells, shredder paper, mica, and combinations thereof.

* * * * *